Figure 1:
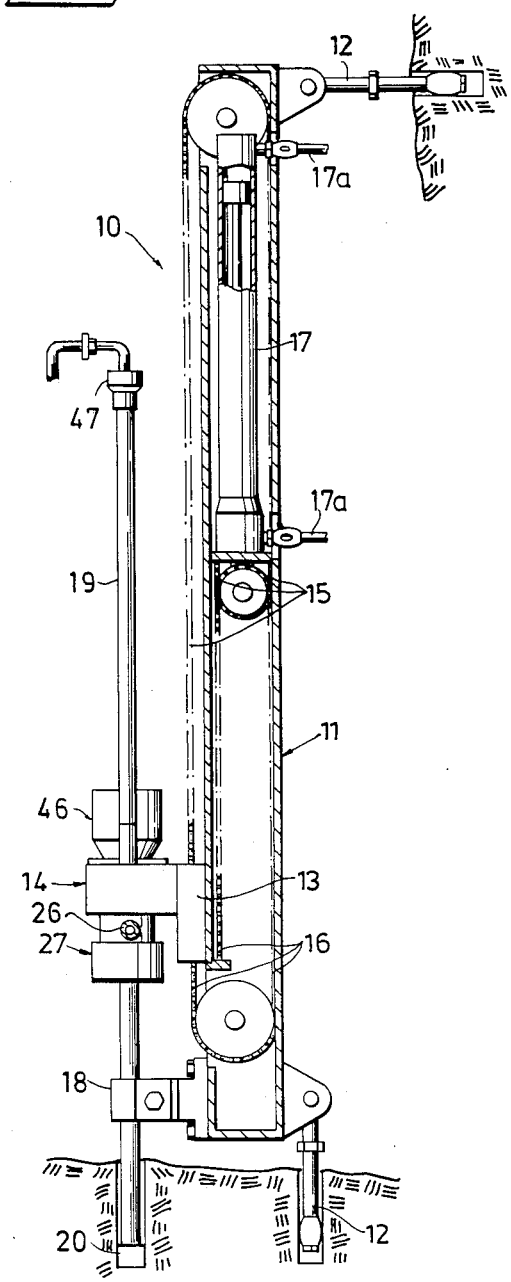

United States Patent [19]

Jonsson

[11] Patent Number: 4,643,262
[45] Date of Patent: Feb. 17, 1987

[54] PRESSURIZED MEDIUM ACTUATED GRIPPING DEVICE

[75] Inventor: Nils G. Jonsson, Täby, Sweden
[73] Assignee: Craelius Aktiebolag, Marsta, Sweden
[21] Appl. No.: 838,415
[22] Filed: Mar. 10, 1986

Related U.S. Application Data

[63] Continuation of Ser. No. 565,355, Dec. 27, 1983, abandoned.

[30] Foreign Application Priority Data

Dec. 27, 1982 [SE] Sweden ............................... 8207418

[51] Int. Cl.$^4$ .............................................. B23Q 5/00
[52] U.S. Cl. .......................................... 173/149; 279/4
[58] Field of Search ............... 173/147, 149, 145, 32; 279/4, 2 R, 2 A; 254/29 R, 30

[56] References Cited

U.S. PATENT DOCUMENTS

| | | | |
|---|---|---|---|
| 2,864,148 | 12/1958 | Wait | 279/4 |
| 3,250,542 | 5/1966 | Winnen et al. | 279/4 |
| 3,565,187 | 2/1971 | Jonsson | 173/149 |
| 4,262,756 | 4/1981 | Blanz | 173/149 |
| 4,422,653 | 12/1983 | Piotrowski | 279/24 |

Primary Examiner—Donald R. Schran
Assistant Examiner—James L. Wolfe
Attorney, Agent, or Firm—Barnes & Thornburg

[57] ABSTRACT

A pressurized medium actuated gripping device which is included in a rock or earth drilling machine for rotary drilling, and is adapted for gripping a drill rod for transmitting rotation and/or axial movement to a string of drill rods, said gripping device including a rotatable housing in which gripping jaws arranged around the drill rod are movable substantially radially relative said rod, and also a sleeve-shaped piston element of elastomeric material, which is sealingly arranged in the housing for separating a pressure chamber, arranged for the supply of pressurized medium and between the housing and the piston element, from a central space, wherein the gripping jaws are arranged, and which is adapted for actuating the gripping jaws into engagement with the drill rod when the pressure chamber is supplied with pressurized medium. The piston element is provided with surfaces which are substantially radially displaceable relative walls surrounding the pressure chamber inside the housing and seal against these walls.

3 Claims, 3 Drawing Figures

PRESSURIZED MEDIUM ACTUATED GRIPPING DEVICE

This is a continuation of Ser. No. 565,355 filed Dec. 27, 1983, now abandoned.

The present invention relates to a pressurized medium actuated gripping device, included in a rock or earth drilling machine for rotary drilling, and adapted for gripping a drill rod string such as to transmit rotary and/or axial movement thereto, the device including a rotatable housing in which gripping jaws are arranged around the string and movable substantially radially thereto, and also a sleeve-shaped piston element made from elastomeric material, which is sealingly arranged in the housing for separating a pressure chamber, arranged for the supply of pressurized medium and between the housing and the piston element, from a central space wherein the gripping jaws are disposed, and which is adapted for actuating the gripping jaws into engagement with the string when the pressure chamber is supplied with pressurized medium.

A gripping device of the kind described above is already known from the Swedish Pat. No. 324 546. A disadvantage burdening this apparatus is that the sleeve-shaped piston element is subjected to large bending and tensional stresses, particularly when the pressurized medium is introduced into the pressure chamber, which is primarily due to that parts of the piston element are rigidly fastened to the housing and can therefore not accompany the rest of the element during its movements. Particularly when the drilling apparatus is used in winter, when working temperature variations are large, these stresses become even more appreciable and result in that the piston element has an unacceptably short life.

Another disadvantage is that the piston element is expensive to manufacture, since its central portion has a quadratic cross-section while its end portions are annularly shaped and formed as wide flanges.

A still further disadvantage is that the axial forces to which the gripping jaws are subjected via the string are translated to, and taken up by, the same surfaces in the housing that the piston element seals against, which causes wear on the surfaces and deteriorates the seal between them and the piston element.

It has also been found that the springs used to force the jaws out of engagement with the string exercise insufficient force, the speed at which the jaws are withdrawn from the string thus being low.

Furthermore, the means in the known apparatus, bridging the distance between the jaws and forming support and protection for the piston element, have short life and deficient supporting and protecting functions.

An object of the present invention is to alleviate the disadvantages in previously known gripping jaws. Another object is to provide a reliable, simple and quickly operable gripping device having long life.

Figure 2:
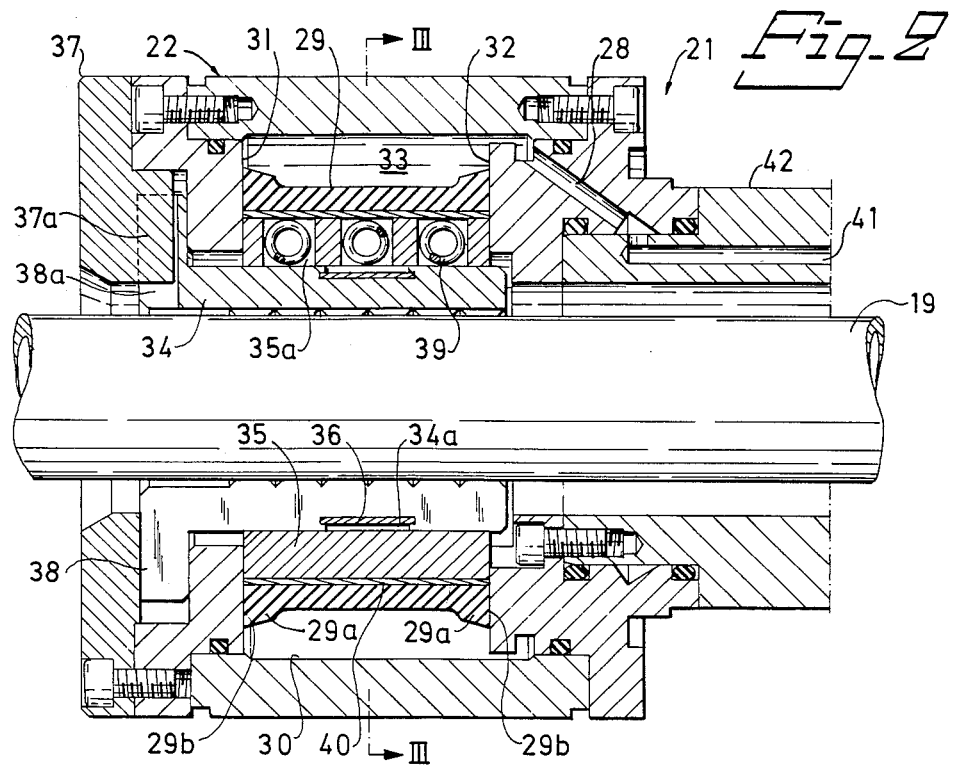
Figure 3:
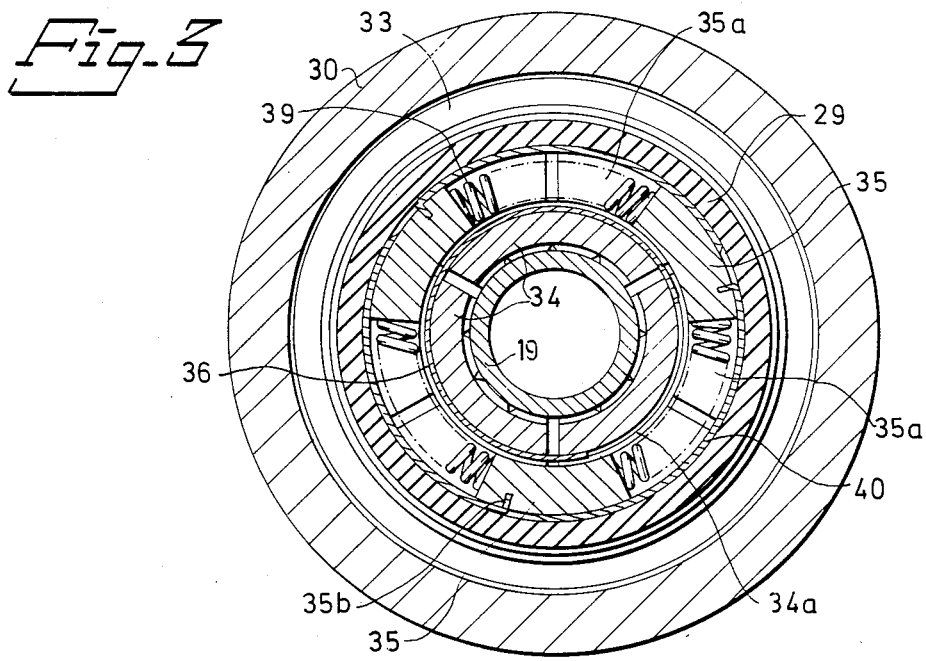

FIG. 1 is a side view, partially in section, of a portion of a rock and earth drilling machine, in which the gripping device according to the invention is incorporated, FIG. 2 is a side view illustrating a longitudinal section of the gripping device according to FIG. 1, and FIG. 3 is a section along the line III—III in FIG. 2.

The rock and earth drilling machine 10 illustrated in the figures has a feed bar 11 carried by expansion bolts 12. The feed bar could be carried by a wheeled substructure instead, or be carried in some other way, if such is found suitable. A slide 13, which carries a drilling head 14, is slidable along the feed bar 11 with the aid of two parallel chains 15, 16 and a feed cylinder 17 having two pressurized medium inlets 17a. On the front portion of the feed bar 11 there is a drill rod holder 18, adapted for guiding a drill rod string during drilling, the string in this case being exemplified by a hollow drill rod 19, as well as for restraining the rod 19 against rotation and axial movement, e.g. during coupling or uncoupling rods. A diamond drill bit (crown) 20 is attached to the bottom end of the rod 19, and flushing water is supplied via a swiveable water connector 47 screwed onto the other end of the rod. A gripping device or chuck 21, in accordance with the invention, is included in the drilling head 14 and has a housing 22 rotatably mounted in the head 14. A cover 37 is a detachable end part of the chuck housing 22. Pressurized medium, preferably hydraulic oil, is supplied through bores 41 in a distribution collar 42 bolted to the chuck housing, these bores leading to passages 28 in the housing 22. Oil is allowed to leak into an unillustrated gap between the stationary drilling head 14 and the rotating collar, this oil being collected and taken back through a hose to a tank. A reversible, hydraulic rotary motor 46 is disposed for rotating the chuck 21 via an unillustrated spur gearing in the drilling head 14.

A sleeve-shaped, cylindrical piston element 29 of elastomeric material, such as nitrile rubber, is accomodated in the housing 22 of the chuck 21 and defines, together with an outer wall 30 and two side walls 31 and 32 on the housing 22, a pressure chamber 33 in communication with the passages 28. The piston element 29 separates the pressure chamber 33 from a central space, through which the drill rod 19 is insertable. Three gripping jaws 34 are arranged in this space for gripping the rod 19, on hydraulic oil actuation of the piston element 29, there also being three jaw holders 35, which are kept in the positions illustrated in FIGS. 2 and 3 by the jaws 34 being urged radially outwards towards the jaw holders with the aid of a leaf spring 36 inserted in slots 34a made in the jaws 34.

Each gripping jaw 34 is provided with a radial flange 38 having a recess 38a into which there projects a portion 37a of the cover 37, whereby, when the chuck 21 is rotated, the torque is transferred directly from the chuck housing 22 to the gripping jaws, so that the piston element 29 is not subjected to torque. The flanges 38 also have the task of preventing axial forces, to which the jaws 34 are subjected by the drill rod 19 and which can attain tens of kN, being taken up directly by the surfaces 31, 32 on the housing 22, against which the piston element 29 seals. This is provided by the flanges 38 being inserted with small clearance between the cover 37 and the portion of the housing 22 situated opposite the side wall 31.

To keep the jaws 34 from their gripping position, helical springs 39 are inserted in recesses 35a in both ends of each holder 35. The number of springs 39 is three between two adjacent jaw holders, and the springs exercise compression forces against the bottoms of the recesses for urging the holders and thereby the jaws away from each other. By the use of helical springs, by these springs being long (which they can be, since they thrust into recesses in the jaw holders and are furthermore curved) and by several such springs being arrangeable between each pair of adjacent jaw holders, a very large force is obtained resulting in that the jaws can be rapidly taken out of engagement with the drill rod 19, and the pressure in the pressure chamber 33 is caused to fall to a predetermined level.

Three curved plates 40 are arranged between the holders 35 and the piston element 29. These plates together form a cylindrical protective and supporting casing, which bridges over the spaces between the holders and prevents the deformation of the piston element 29; this deformation would otherwise occur if the element were pressed into the spaces between the holders and in the recesses 35a. Each plate 40 is removably attached to a holder 35 by a folded-over edge of the plate being inserted in a slot 35b in the outer surface of the holder. Instead of these three plates 40, a single flexible plate bent into a cylinder with overlapping edges may be arranged between the jaw holders and the piston element, the size of the overlap depending on the different radial positions the holders assume.

The piston element 29, which is not clamped in place but is freely movable radially, is provided with two sealing lips 29a which are prestressed against the walls 31 and 32 so that the outer, radial annular surfaces 29b of the lips sealingly engage against these walls. The mentioned radial surfaces 29b engage against surfaces, each of which forms an angle to the associated radial surface which is less than 90°, such that when pressurized medium is taken into the pressure chamber 33 the radial surfaces will be further urged against the walls 31 and 32. When the piston element 29, and thus the sealing lips 29a, are displaced radially relative the walls 31 and 32, which occurs when the drill rod 19 is gripped and released, a very small quantity of oil, accomodated in surfaces disparities in the complementarily sealing surfaces on the piston element and side walls 31 and 32, will be fed to the jaw holders 35 and jaws 34, to give a controlled lubrication effect facilitating movement of jaws and holders and preventing their seizure due to rust.

It will be understood that even if only one embodiment of the invention has been described above and illustrated in the drawings, the invention is not limited hereto, but is only restricted by the disclosures in the claims.

I claim:

1. Pressurized medium actuated gripping device included in a rock or earth drilling machine for rotary drilling and adapted for gripping a drill rod such as to transmit rotation and/or axial movement to a string of drill rods, said device including a rotatable housing in which gripping jaws are arranged around the drill string and movable substantially radially relative to the drill string, and also including a sleeve-shaped piston element of elastomeric material, which is sealingly arranged in the housing for separating a pressure chamber arranged for the supply of pressurized medium and between the housing and the piston element, from a central space wherein the gripping jaws are arranged, and which is arranged for actuating the gripping jaws into engagement with the drill rod when the pressure chamber is supplied with pressurized medium, the device further including separate jaw holders inserted between the piston element and the gripping jaws, said holders being urged by spring bias in a direction towards the interior of the piston element for keeping the gripping jaws connected to the jaw holders from engagement with the drill rod when the pressure chamber is not subjected to pressure from the pressurized medium at least one element are mounted on the outside of the jaw holders and briding over the spacing between the holders, said element(s) forming an annular protective means between the outsides of the jaw holders and the inside of the piston element, the piston element having a circular cross section and its sealing surfaces including two opposing annular, radial end edges of the piston element.

2. Pressurized medium actuated gripping device included in a rock or earth drilling machine for rotary drilling and adapted for gripping a drill rod such as to transmit rotation and/or axial movement to a string of drill rods, said device including a rotatable housing (22) in which gripping jaws (34) are arranged around the drill string and movable substantially radially relative to the drill string, and also including a sleeve-shaped piston element (29) of elastomeric material, which is sealingly arranged in the housing for separating a pressure chamber (33) arranged for the supply of pressurized medium and between the housing and the piston element, from a central space wherein the gripping jaws are arranged, and which is arranged for actuating the gripping jaws into engagement with the drill rod when the pressure chamber is supplied with pressurized medium, characterized in that the piston element (29) is radially freely displaceable with respect to radial sealing walls (31, 32) surrounding the pressure chamber (33), in that the piston element (29) is arranged at a distance from the gripping jaws (34) at least partly bridged by annular means (40) protecting the radially inner surface of the piston element, in that the piston element (29) has a circular cross section (FIG. 3), and in that the piston element (29) has sealing surfaces including two opposing, annular radial end edges (abutting radial sealing walls 31, 32) of the piston element (29).

3. A pressurized medium actuated gripping device comprising a plurality of radially movable gripping jaws (34) defining a central passageway for receiving a drill rod (19), slots (38a) in end portions of the gripping jaws separate (34), peripherally spaced jaw holders (35) positioned radially outwardly from the gripping jaws (34) and surrounding and enclosing the gripping jaws (34), spring means (39) disposed between adjacent jaw holders (35) to urge the jaw holders (35) radially outward from the gripping jaws (34), a band section (40) surrounding a portion of the radially outer surface of each jaw holder (35) and overlapping a portion of the radially outer surface of an adjacent jaw holder (35), the band sections (40) associated with the various jaw holders (35) thus forming a protective enclosure around the jaw holders (35), the enclosure expanding as the jaw holders (35) move radially outward away from the drill rod (19) and contracting as the jaw holders (35) move radially inward toward the drill rod (19) the enclosure permitting substantially free radial movement of the jaw holders (35), a housing (22, 37) defining an interior (33), the interior (33) including a plurality of members (37a) for projecting into the slots (38a) to rotatably drivingly engage the gripping jaws (34) to the housing, the interior (33) further defining a pressurized medium chamber (33) and means defining a passageway (28) for the flow of pressurized medium to and from the chamber (33), and an elastomeric sleeve (29) for surrounding the assembly of the gripping jaws (34), the jaw holders (35), their spring means (39) and the band sections (40) in assembled orientation, and for separating the assembly from the pressurized medium chamber (33), pressurization of the pressurized medium chamber urging the jaw holders (35) radially inward and their associated band sections (40) further into jaw holder (35) enclosing orientation which in turn urges the gripping jaws (34) into engagement with the drill rod (19).

* * * * *